United States Patent Office 3,506,823
Patented Apr. 14, 1970

3,506,823
VEHICLE SPEED CONTROL SYSTEM
Charles W. Failor, Forest Hills, Pa., assignor to Westinghouse Air Brake Company, Swissvale, Pa., a corporation of Pennsylvania
Filed Dec. 21, 1967, Ser. No. 692,373
Int. Cl. B61l 23/16
U.S. Cl. 246—66                                11 Claims

ABSTRACT OF THE DISCLOSURE

A speed control system for vehicles traversing a fixed roadway. Operating control apparatus carried on each vehicle is coupled to wayside conductors arranged in a preselected pattern dividing the roadway into sections. Signals transmitted from a vehicle are reflected as distinctive signals by an inert device, responsive only to said transmitted signals, connected between selected conductors at exit end of the immediate advance section. Reception or non-reception of reflected signals by vehicle control apparatus actuates normal or restricted speed control, respectively. An occupancy detection shunt connection on each vehicle, coupled across said selected conductors, bypasses signals transmitted from a closely following vehicle to block reflection of distinctive signals by corresponding inert device, thus restricting speed of the following vehicle.

---

This invention relates to a vehicle speed control system. More particularly, my invention relates to a speed control system for vehicles moving, either individually or in short coupled combinations, over a fixed roadway not necessarily of the conventional two rail type known in the railroad art, these vehicles carrying either passengers or freight.

Considerable emphasis is presently being given to special transportation systems, for both passengers and freight, which will function in limited areas such as airports, city business districts, or between nearby terminals of conventional transit systems. These systems may be either a loop arrangement or involve point to point travel and return to the starting point. Such systems operate with single vehicle movements or at most, very short trains of such vehicles coupled together. In general, the vehicle and the right-of-way are of non-conventional construction when considered relative to a conventional transit system. The vehicles may be rubber tire vehicles moving on concrete trackways or may even be cylindrical shaped vehicles operating in tubes in which they are guided by surrounding rails. Such arrangements may also involve modification of known monorail apparatus. Specific examples of systems to which my invention might be applied may be found in U.S. Patents No. 3,006,288 issued to Owen Brown on Oct. 31, 1961, No. 3,118,392 issued Jan. 21, 1964 to Charles H. Zimmerman, and No. 3,263,625 issued Aug. 2, 1966 to A. M. Midis et al. In any such distinctive construction, problems are created in the matter of train or vehicle detection and control. This is especially pertinent since automatic operation of the system is normally considered a part of the overall arrangement. In most cases, the conventional vehicular wheel and axle shunt across steel rails is either not present or is unreliable in operation due to the nature of the system and the type of vehicles being used. While systems have been proposed in the past for the control of the speed or movement in similar type transit arrangements, they have not been altogether satisfactory. For example, they lack flexibility in operation or have proved to be too expensive and cumbersome. It is also desirable to reduce the wayside apparatus in such systems, especially that requiring frequent maintenance or that is subject to operating failures. In other words, as much as possible, the control system for the automatic movement of the vehicles should be self-contained on each vehicle.

Accordingly, it is an object of my invention to provide a speed control system for vehicles and/or trains moving along a fixed right-of-way.

Another object of my invention is a speed control system for vehicles moving along a fixed right-of-way in which the active portion of the control apparatus is carried on the vehicle.

A further object of my invention is the provision of a speed control system for vehicles moving along a fixed right-of-way in which the speed limits are established in accordance with measurements from the vehicle of the relative distance is advance of that vehicle which is clear of occupancy by a preceding vehicle.

It is also an object of my invention to provide a system for controlling the speed of a vehicle in which the normal speed range is maintained when sensing signals transmitted from the vehicle along the right-of-way in advance of its movement are reflected back by associated wayside devices to indicate the absence of any preceding vehicle within preset sections of the right-of-way.

A specific object of the invention is apparatus carried on a vehicle which senses the character of a signal reflected back to that vehicle from a wayside device, as a result of an initial distinctive signal transmitted from the vehicle itself, to determine the occupancy condition of the right-of-way in advance over a preset distance and to govern the vehicle speed accordingly.

Another specific object of my invention is an arrangement of apparatus for use on a vehicle, moving along a fixed right-of-way, which measures the non-occupied distance, within predetermined wayside limits, in advance of that vehicle in accordance with the character of a distinctive signal reflected back to the vehicle in response to a signal transmitted from the vehicle over wayside channels.

Still another object of my invention is a speed control system for a vehicle moving along a fixed right-of-way in which a distinctive signal is transmitted from that vehicle along the fixed right-of-way in advance of its movement in order to detect the presence or absence of any preceding vehicle within preselected sections of the right-of-way in advance, the speed of the signaling vehicle being controlled by the nature of the return signal received either by reflection from a preceding train or from a wayside device associated with and/or responsive to the distinctive signal.

Other objects, features, and advantages of my invention will become apparent from the following specification when taken in connection with the accompanying drawings and the appended claims.

In practicing my invention, I provide along the wayside of the fixed right-of-way a plurality of communication channels to carry distinctive signals transmitted from each vehicle as it traverses the stretch. These channels are arranged in a pattern which in effect divides the right-of-way into preselected section lengths. Each section is used to establish the location of vehicles as being within a particular section. In the specific showings herein, the channels comprise a plurality of conductors or wires, at least the minimum of three, one being continuous along the right-of-way, the others being divided into section lengths. These conductors occupy specific positions with respect to the right-of-way and are cross connected from section to section in the direction of movement of vehicles so that at each section location a particular communication channel advances to the next higher position of relative importance, taken in connection with the detection of the occupancy of the section by a vehicle.

Each vehicle is provided with vehicle sensing means comprising transmitting and receiving apparatus which acts to detect the presence of a preceding vehicle along the right-of-way. The transmitter transmits a distinctive signal, that is, distinctive within the wayside communication channels of the control system. For example, in at least one specific arrangement shown, alternating current, of the same frequency as the vehicle propulsion source, constitutes the distinctive signal current. In certain arrangements, a further distinction is obtained from the character of the return signal which is reflected back through the wayside communication channels to the receiving apparatus. The signal from the transmitter is coupled to the wayside channels and transmitted forward from the vehicle, i.e., in the direction of its movement. In other words, the signal is transmitted in advance of the vehicle at least into the next advance section of the right-of-way. A specific form of coupling devices used in arrangements of my invention are vehicle mounted slide contactors which maintain electrical contact with the wayside conductors forming the channels during vehicle movement.

At the exit end of each section of the right-of-way, a sensor associated device is connected into selected channels to reflect the signals transmitted from a vehicle occupying an approach section. This sensor associate device is specifically shown as being connected between the continuous conductor and a second conductor designated as the prime position conductor of the system. This sensor associate device passes the signal received, or passes and converts the signal, reflecting it back towards the approaching vehicle. In one specific example, the alternating current signal transmitted from the vehicle is received by a sensor associate device consisting of a diode or half-wave rectifier. The reflected signal is then in effect, a half-wave rectified or pulsating direct current. The reception of the reflected signal on the vehicle by the receiving apparatus actuates the speed and propulsion controller to establish a normal speed range. This action results since the reception of the reflected signal is an indication that the right-of-way in advance of the vehicle at least through the immediate advance section is clear of any preceding trains and it is thus safe for a vehicle to continue its movements at a normal speed.

Each vehicle also carries a train occupany indication means which acts to block the return of the signal transmitted from a following train. The specific showing of the occupancy means is a shunt connection between the contactors which couple to the continuous and the prime position conductors along the wayside. This shunt connection negates the effect of the sensor associate on the transmitted signal so that there is no reflection of a distinctive signal. For example, when alternating current is being transmitted into the wayside conductors by each train, this alternating current signal is not converted into a pulsating direct current when the half-wave rectifiers are bypassed by a train shunt. This absence of the reception of a reflected signal on a vehicle, i.e., by a vehicle receiver, indicates an occupancy of the next advance section by a preceding vehicle. The vehicle sensor apparatus, that is, specifically the receiver apparatus, then actuates the speed control arrangement on the vehicle to establish a restricted speed range in order that the vehicle will not close up on the preceding vehicle at an unsafe speed. Other speed ranges or propulsion control actions may be added to the system as desired in various manners that will be described.

I shall now described in specific detail various embodiments of my invention in connection with the accompanying drawings in which.

Figure 4:
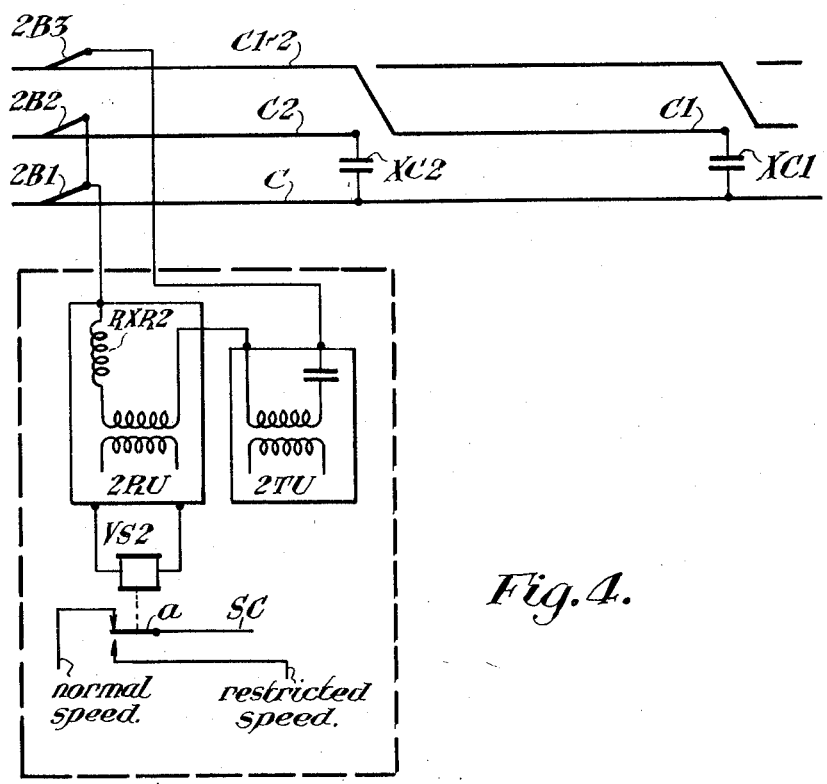

Another form of my invention is embodied in the partial system illustrated in FIG. 4.

Figure 5:
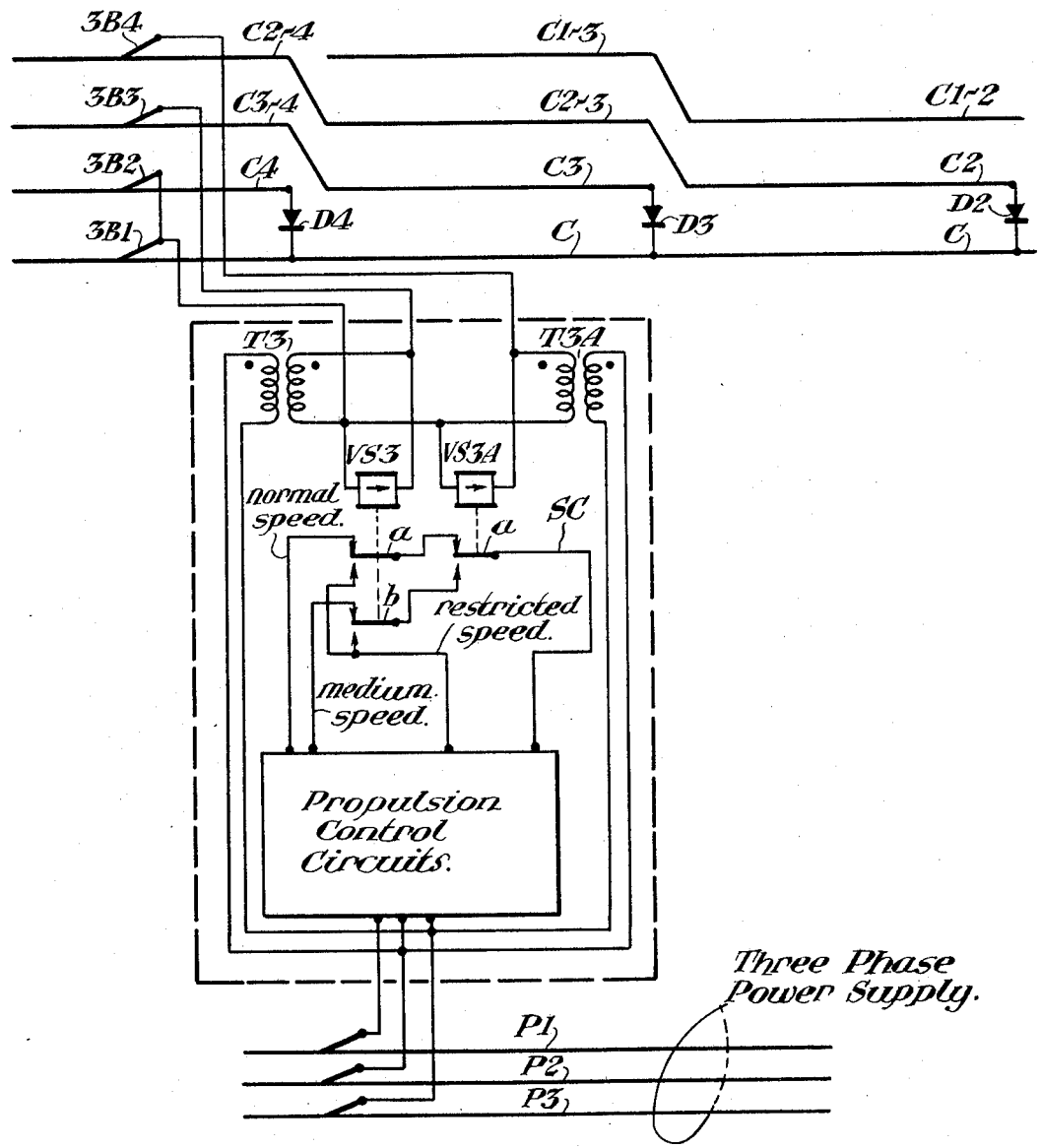

In FIG. 5, a modification of the system embodying the first form of my invention is shown by which an additional speed range or signal is obtained.

Figure 2:
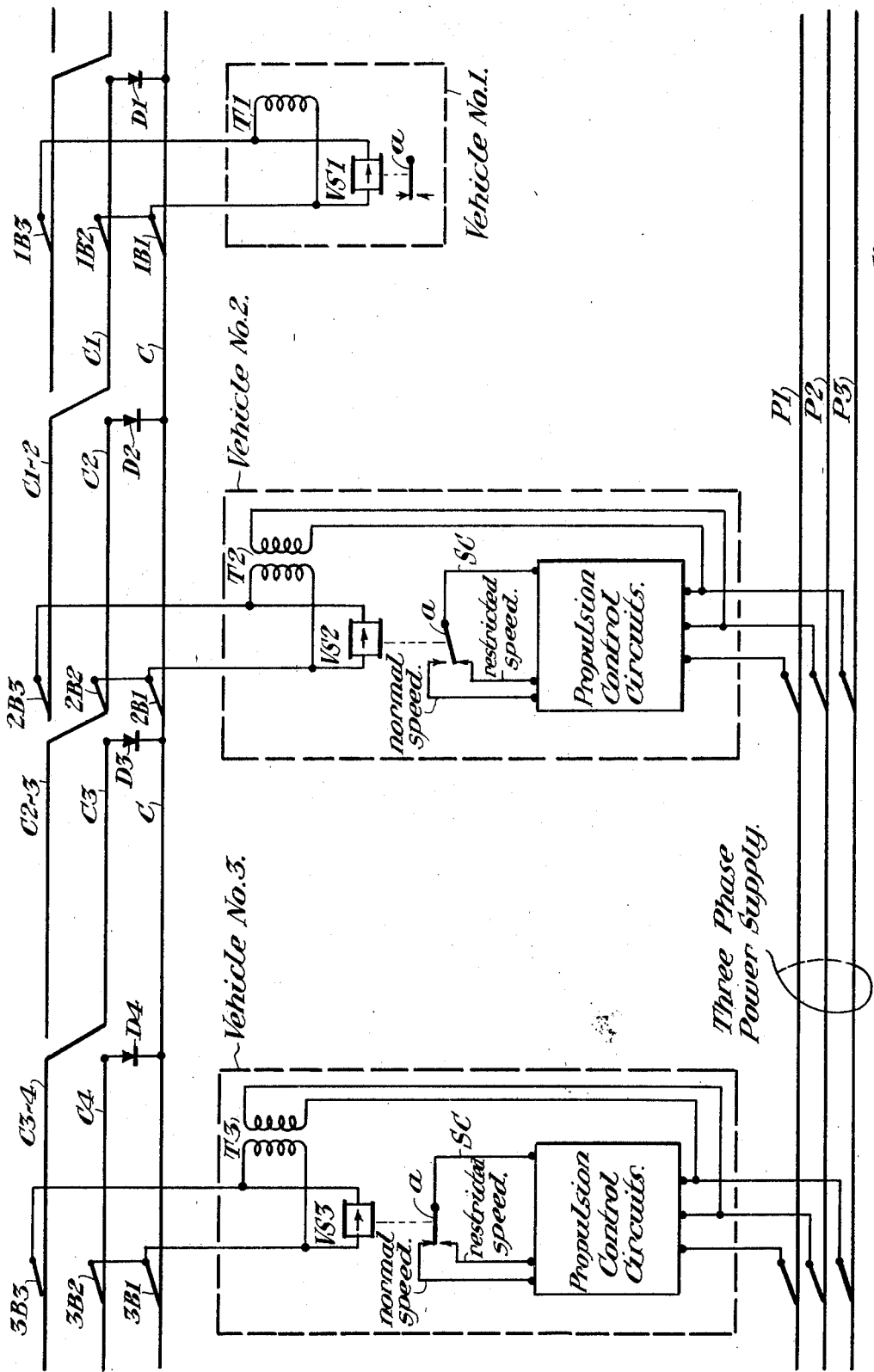
FIG. 2 is a schematic illustration of a vehicle speed control system embodying a first form of my invention.
Figure 6:
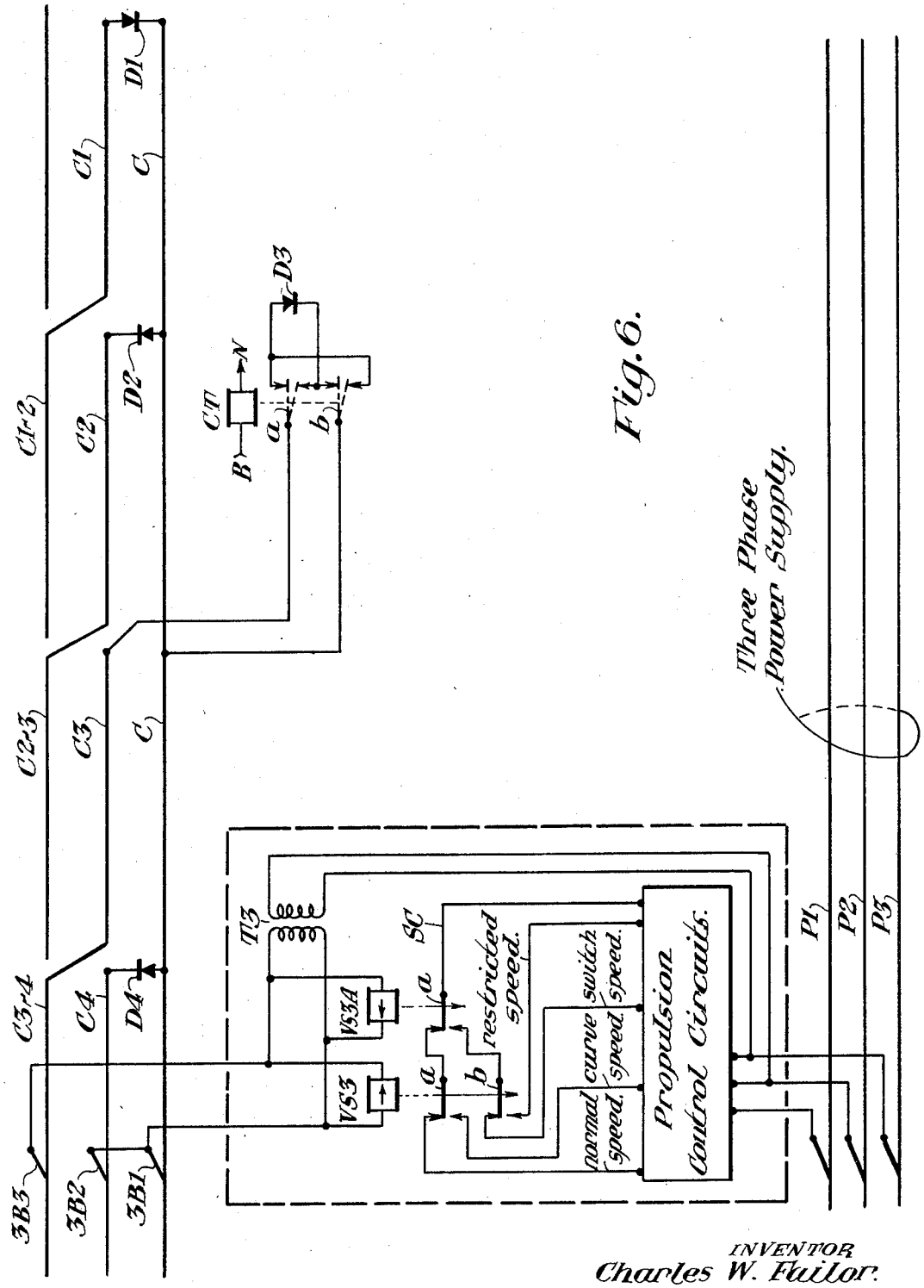

A more extensive modification of the system of FIG. 2 involving additional wayside apparatus is illustrated schematically in FIG. 6.

In each figure of the drawings, similar reference characters refer to similar parts of the apparatus.

Figure 1:
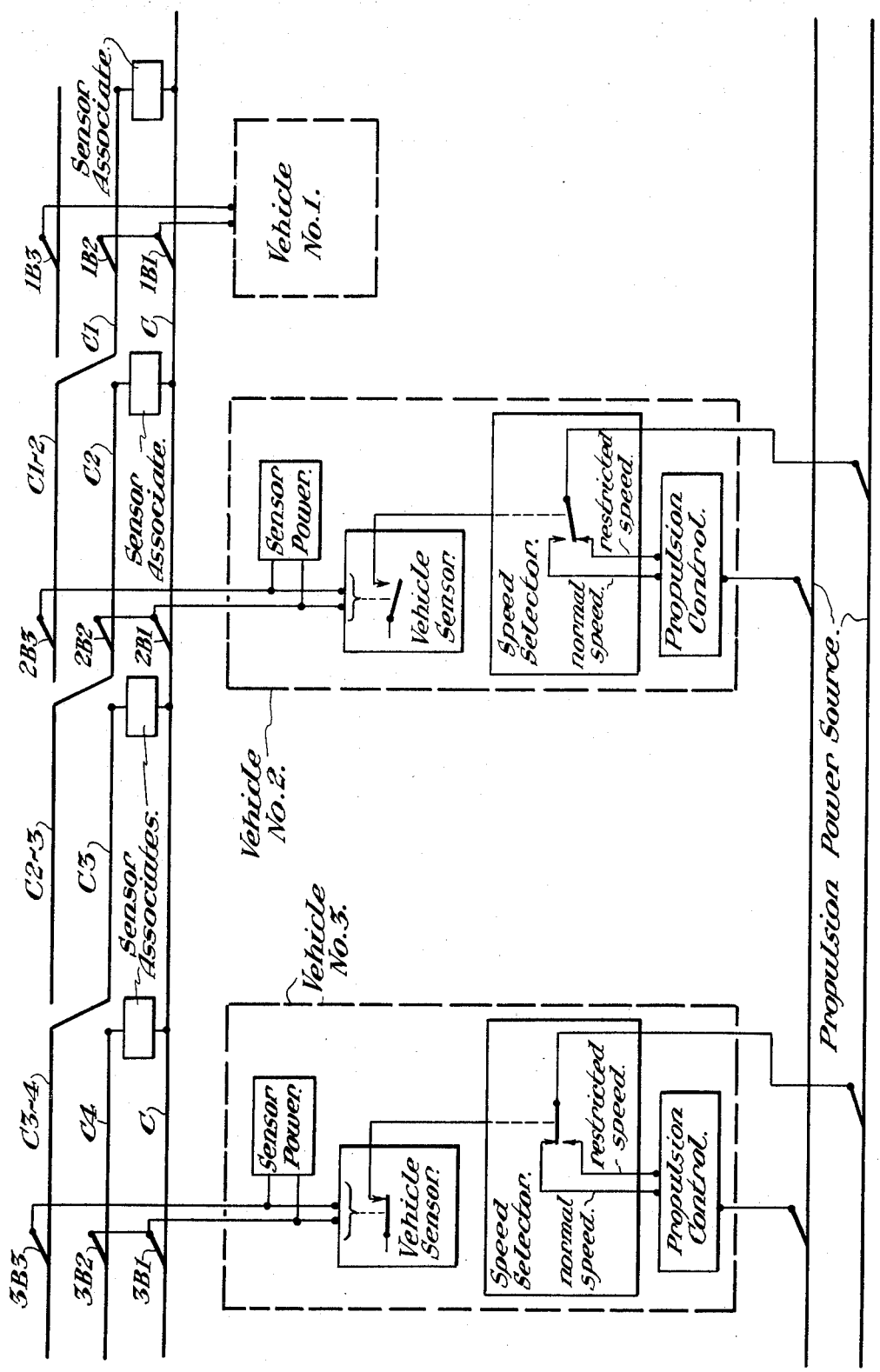
FIG. 1 is a diagrammatic showing using conventional symbols of the general concept of the speed control system of my invention.

Referring now to FIG. 1, I shall describe the general concept of my invention. Across the top of this figure of the drawings is shown, not the trackway for a vehicle, but parallel conductors along the side of the right-of-way. These conductors form a pattern of wayside communication channels. It is to be noted that the bottom or first position conductor, designated by the reference character C, is continuous while each of the conductors in the other two positions is divided to form sections of the right-of-way. The conductor occupying the middle position, as shown in this drawing, is designated herein as the prime position conductor. For purposes of vehicle detection, this is the principal associate with the continuous conductor and is shown in each figure adjacent thereto. Only one other conductor is shown in this general concept system, i.e., the third position conductor which by definition herein occupies a lesser preference position. Any additional "other" conductors which may be used in other arrangements would be occupying even lower preference positions. It is to be further noted that four sections of the right-of-way are shown. Since vehicles are assumed to move from left to right in the drawing, the exit end of each section is the right-hand end of the particular section. For purposes of the description, however, the sections are numbered from the right, the reference designations being the same as that of the numeral in the reference character for the prime position conductor for that section. The numerical part of the reference characters for other position conductors in each section indicates, by the first number, the section in which the path of that channel occupies the prime position and, by the second number, the immediate associated section.

At the exit end of each section, a device, here conventionally shown by a block designated as a sensor associate, is connected between the prime position conductor and the continuous conductor to form a wayside communication channel. Its operation will be described shortly and specific illustrations of such devices will be described in connection with the other figures of the drawing. Also at the exit end of each section, the third position conductor is cross connected to the prime position conductor of the next section in advance, that is, to the right, the direction of vehicle movement. When additional other conductors are used, each conductor in a lower preference position will be cross connected to the next higher preference conductor of the advance section. As will become apparent, this typical cross connection pattern of the sectionalized conductors and the use of the sensor associates, to form a pattern of wayside communication channels, is important in the detection of the location of vehicles and the exercise of the speed control upon approaching vehicles.

These vehicles are indicated as moving along the right-of-way by conventional dash line blocks designated numerically as Vehicles Nos. 1, 2, and 3 in the order of their movement throughout the system. These vehicles may be of the possible types shown in the previously referenced patents but, of course, the system of my invention is not limited to such type vehicles and the corresponding rights-of-way illustrated therein. Only vehicles 2 and 3 are shown with the full complement of conventional apparatus of the general concept system, as this is all that is needed for an understanding of the operation of the system of my invention. The apparatus mounted on each vehicle may be coupled to the wayside conductors in various ways. I have chosen to specifically illustate the couplings as being sliding contactors riding on each conductor during the vehicle movement, equivalent to the third rail shoes used in well-known transit propulsion systems. Each of the illustrated contactors carried by the vehicle always makes connection with the same position conductor in each section. In the basic system shown, where there are three wayside conductors, each vehicle is provided with three contactors designated as contactors B1, B2, and B3 in the order of the preference position of the conductor with which each makes contact within a particular section, the continuous conductor being designated the first position. In order to distinguish between the different vehicles, a numerical prefix is added to the reference characters for the contactors. For example, the center or No. 2 vehicle is provided with contactors 2B1, 2B2, and 2B3. On each vehicle, a permanent connection is made between the contactors B1 and B2, as illustrated for each of the vehicles shown in FIG. 1. This connection is at times also defined herein as a vehicle occupancy indication or shunt connection.

Each vehicle is provided with vehicle sensing or detection apparatus comprising a vehicle sensor and sensor power source, a speed selector, and a propulsion control, all shown by conventional blocks within the symbol designating the vehicle itself. Each vehicle sensor unit and associated sensor power unit are connected in multiple across the contactors coupling with the continuous wayside conductor and the third position conductor. For example, on Vehicle No. 3, the vehicle sensor and sensor power unit are shown connected in multiple across contactors 3B1 and 3B3, which make contact, respectively, with wayside conductor C and with the conductor C3-4 in the third position of that section. The sensor power unit is capable of transmitting into the conductors a distinctive signal or at least a signal which can be returned, in a manner to be described, by the sensor associates as a distinctive signal which may be detected by the vehicle sensor unit. The operating element of the vehicle sensor unit is shown conventionally as being a single position switch contact which is either closed or open, that is, in its upper or lower position, in accordance with whether a return signal is being received or not received, respectively, by the vehicle sensor. The operation of the contact within the vehicle sensor unit is shown by conventional dotted lines, specific arrangements being described and shown in the other figures of the drawing. The operating element of the speed selector is similarly shown as being a two-position switch contact. In other words, this switch contact completes circuits in both its upper and lower position over the corresponding fixed position contacts shown. When the speed selector contact is in its upper position, the circuit is completed for selecting a normal speed range for its vehicle. Conversely, the closing of the circuit in the contact lower position selects a restricted speed range for propulsion of the vehicle. Speed range selections are indicated by the note designations within the selector unit.

Various types of propulsion control units are known in the transporation art and a selection from these known units would be made in accordance with the type vehicle being used in the particular system. For this reason, the propulsion control unit is shown as a conventional block not only in this general concept system but in each form of the invention illustrated in the other drawings, since propulsion control of itself is not part of the novel portion of the system of my invention. At the bottom of FIG. 1, the wayside propulsion power source is illustrated as a two-wire line which would be energized by a suitable source of the type, character, and capacity required for the system. Each vehicle carries the necessary contactors, similar to the sensing contactors in the upper drawing portion, for providing contact with the propulsion power source. In other words, each vehicle carries the equivalent of at least two third-rail shoes for its power pickup. This illustration is here used since the right-of-way may not necessarily provide a suitable propulsion current return path, which must then be provided within the propulsion source. As actually shown, the connection from one of the power pickup contactors is carried directly to the heel of the movable contact within the speed selector. The circuit is then completed for the power supply over the normal speed or the restricted speed contacts to the propulsion control unit, returning from the propulsion control unit to the other contactor on the second power source line. This conventional showing will illustrate, as will be described, the selection of the speed range at which the propulsion control is operated in order to control the movement of the vehicle along the fixed right-of-way.

By the proper selection and use of filters and blocking units, it would be possible in some arrangements of my invention to utilize one or more of the propulsion power lines also as signaling channels. Such overlay arrangements of communication and power circuits are well known and, although such economy of wayside conductors is here included by reference in systems embodying my invention, specific illustration is omitted to avoid undue length of the specification.

Describing the operation of this concept system I shall consider first the apparatus in Vehicle No. 3. The sensor power unit in this vehicle transmits a signal over contactors 3B1 and 3B3 and the wayside conductors with which they make electrical contact. This signal flows through the wayside communication channel and is reflected back by the sensor associate connected between conductors C3 and C at the exit end of section 3. The sensor associate unit, as will be explained with specific systems, is responsive only to the distinctive signal transmitted from vehicle 3 and not to other signals which may extraneously appear in the wayside conductors. The reflected signal from the sensor associate is received on vehicle 3, over the same channel including contactors 3B1 and 3B3, by the vehicle sensor. Since the signals are received, the contact of the sensor unit is actuated to its upper position so that the circuit is closed. This closed contact actuates the speed selector to move its contact to the upper position, closing against the fixed contact to complete the normal speed range selection circuit. Application of power from the power source over this circuit to the propulsion control unit actuates the control which maintains the vehicle in its normal speed range as it moves along the fixed right-of-way. In effect, the reception of the signal, transmitted from the vehicle and reflected by the sensor associated back to the vehicle itself, is an indication that the next advance section, that is, section 3, in the direction of the movement of the vehicle is free of occupancy of any preceding vehicle. Thus it is safe for the vehicle to proceed.

In considering the operation of the apparatus on Vehicle No. 2 which is shown occupying section 2 of the right-of-way, it is to be noted that the shunt or occupancy connection between contactors 1B1 and 1B2 of Vehicle No. 1, which is in section 1, provides a shunt path between conductors C and C1 within section 1. Thus the signal transmitted from vehicle 2 by its sensor power unit, over contactors 2B1 and 2B3 through wayside conductors C and C1-2, is shunted or bypassed away from the sensor associate unit at the exit end of section 1. Thus there is no reflected distinctive signal from this sensor associated transmitted back to the apparatus of vehicle 2. In the absence of any such signal being received by the vehicle sensor on vehicle 2, its operating contact is not actuated and remains in its open position. This condition actuates the associated speed selector of vehicle 2 to operate its contact to its lower position, completing the circuit to the restricted speed range selection. Thus the propulsion control unit of vehicle 2 is energized from the propulsion power source over the connection to the heel of the speed selector contact and thence over this contact in its lower position to the restrictive speed selection circuit of the propulsion control, returning ot the power propulsion source over the other vehicle contactor. This results in forward movement of vehicle 2 at a restricted speed, allowing it to close up at this slow speed upon the vehicle occupying section 1. The term restricted speed has been used herein to indicate a very low speed and/or, depending upon the type system involve, possibly a full stop by the vehicle before it enters the advance section.

It is also obvious that, if vehicle 3 enters the advance section from its illustrated position, that is, section 3, prior to the time that vehicle 2 has made any appreciable forward movement, the signal applied from vehicle 3 over its contactors across wayside conductors C and C2–3 will be shunted, by the permanent connection between contactors 2B1 and 2B2, away from the sensor associate at the exit end of section 2. Under these conditions, the speed of vehicle 3, in a manner similar to that just described for vehicle 2, will be reduced to its restricted speed range so that it may continue to advance at a low speed, closing up upon vehicle 2. Thus the basic concept of the system of my invention allows a vehicle to proceed at a normal speed range as long as a sensing is made that the next advance section of the right-of-way is clear of any occupancy by a preceding vehicle. However, as soon as an advance section is sensed as being occupied by a preceding vehicle, the speed of the sensing vehicle is immediately reduced to a restricted speed range at which it may continue to slowly close up upon the preceding vehicle under safe conditions.

Referring now to FIG. 2, there is shown therein the first specific form embodying my invention in a two speed or signal indication system. Across the top of this drawing are the wayside conductors in the same number and pattern as that of the general concept system of FIG. 1. The same type of reference characters are used to designate the various portions of the conductor pattern as before. It is to be noted that the sensor associate at the exit end of each section is specifically shown as being a diode or a half-wave rectifier designated by the reference character D with a numerical suffix in accordance with the section of the right-of-way in which it is located. That is, the sensor associated for section 3 is the diode designated D3. The polarity of the connection of these diodes is selected in order to provide the desired operation, in this particular showing the same polarity connections being used in all sections. The coupling between the vehicle and the wayside conductors is the same as previously described and the same reference characters are used. Again, a permanent direct shunt connection is provided between contactors B1 and B2 on each vehicle.

Of the three vehicles again shown for purposes of explanation, I shall consider first Vehicle No. 3 which contains apparatus similar to that on all vehicles. The sensor power means is a transformer, designated T3 in this particular vehicle, whose secondary winding is connected across the vehicle contactors 3B1 and 3B3. The primary winding of transformer T3 is directly connected to a single phase of a three phase propulsion power supply which is shown as an example of the type of power supply that may be used in such transportation systems. In other words, as a specific example, it is assumed that the vehicle propulsion means is energized by three phase alternating current power. Each vehicle picks up power over three contactors, for example, of the third rail type used in subway systems. Three phase power is supplied directly to the propulsion control circuits which include the necessary speed control arrangements to be defined shortly. The sensor power transformer primarily winding is then connected directly across the vehicle power contactors so as to be energized from the single phase P2–P3. Alternating current of commercial frequency is thus supplied to the primary of thansformer T3 and from its secondary winding across contactors 3B1 and 3B3 of vehicle 3. An identical power supply arrangement is provided for the other vehicles in the system.

In this specific showing of FIG. 2, the vehicle sensor is a relay designated in each case as being of the biased type in order to increase the sensitivity of vehicle detection. For example, on vehicle 3 the vehicle sensor is relay VS3 whose biasing is shown by the arrow within the relay symbol. In operation, the relay will pick up its contacts only when direct current flows through the relay winding in the direction of the arrow. The use of such biased relays is not absolutely necessary in this particular form of my invention, but is here shown as an illustration of the increased sensitivity that may be desirable. It is to be seen that the winding of relay VS3 is connected in parallel with the secondary of transformer T3 across the contactors coupling to the wayside conductors. Relay VS3 is provided with a single contact $a$ which is picked up to close the circuit through its front contact when the relay is energized. Contact $a$ is released and closes the circuit through its lower or back contact when the relay releases because of deenergization or because of flow of current in the wrong direction through the relay winding. It is to be noted that the lack of energization may result from application of alternating current to the relay winding as well as a no-current condition.

Circuits through contact $a$ of relay VS3 select the speed range for the propulsion of the corresponding vehicle. The closing of front contact $a$ selects the normal speed range while the closing of back contact $a$ when the relay is released selects the restricted speed range. These circuits, of course, originate at the propulsion control circuit unit, extending over lead SC to the heel of contact $a$ and thence over the front or back contact to select the normal or restricted speed range terminal, respectively. Once the speed range is selected, the propulsion control circuit unit acts to maintain the vehicle at or wihin the selected speed range. It may be noted that vehicle 2 shown in the center of FIG. 2 is similarly equipped with identical apparatus. Other vehicles such as vehicle 1 at the right would also be so equipped but a full showing of such equipment is not necessary for understanding the operation of this particular embodiment of my invention.

The operation of the system shown in FIG. 2 is based on the half-wave rectification of the alternating current supplied from the propulsion power source through a transformer such as T3. For example, when the upper terminal of the secondary winding of transformer T3 has the instantaneous positive polarity, the circuit may be traced from this terminal over contactor 3B3, conductors C3–4 and C3, through diode D3 in its forward direction, conductor C, and contactor 3B1 to the lower terminal of the secondary winding. The circuit resistance of this traced circuit is of such nature that current is effectively shunted away from the winding of relay VS3 and flows almost entirely in the wayside conductors. However, when the lower terminal of the secondary winding of transformer T3 has the instantaneous positive polarity, the flow of current through the wayside conductor circuit above traced is blocked by diode D3, since the attempted flow of current is in the reverse or high resistance direction through this diode unit. Since the wayside conductor circuit thus has such an extremely high resistance, the principal current flow is rather through the winding of the relay from the lower terminal of the secondary winding through the relay winding in its normal direction, as indicated by the arrow, to the upper terminal of the secondary winding. Relay VS3 is thus energized by a pulsating direct current under the conditions shown in the drawing due to the half-wave rectification action of diode D3. Relay VS3 is so selected as to type that this pulsating, half-wave rectified direct current is sufficient to energize the relay so that it picks up, closing its front contact $a$. In other words, the direct current component flowing through the relay winding in the direction of the arrow sufficiently energizes the relay that it operates to close its front contacts. Closing of front contact a of relay VS3 in this situation selects the normal speed circuit and so actuates the propulsion control circuits that the vehicle speed is maintained in this normal speed range.

Shifting now to a consideration of Vehicle No. 2 for the opposite case, it has already been noted that each vehicle is provided with similar apparatus. The numerical suffix of the reference characters designating the apparatus denotes the vehicle on which it is provided. The output of the secondary winding of transformer T2 is applied by contactors 2B1 and 2B3 across wayside conductors C and C1–2. However, with Vehicle No. 1 occupying the wayside section 1, the connection between its contactors 1B1 and 1B2 provides a shunt connection between contactors C1 and C which bypasses diode D1 at the exit end of section 1. Therefore, a circuit path exists in the wayside channel for both half cycles of the alternating current supplied from the secondary of transformer T2. The circuit is traced from the upper terminal of the secondary winding over contactor 2B3, conductors C1–2 and C1, the permanent direct connection between contactors 1B2 and 1B1, conductor C, and contactor 2B1 to the lower terminal of the secondary winding. Thus both half cycles of the alternating current from the transformer secondary are shunted away from the winding of relay because the current flows in both directions through the circuit just traced as a result of the shunt connection supplied by vehicle 1. At best, the minimal current flow in the winding of relay VS2 has primarily an alternating current component so that the relay remains released as expected under these conditions. With relay VS2 released to close its back contact a, the speed selection circuit is traced from the propulsion control circuit over lead SC and back contact a of relay VS2 to the restricted speed circuit which actuates the control circuits to maintain this vehicle at its restricted speed level. This change in speed control will occur immediately upon the entrance of vehicle 2 into section 2, that is, the position in which it is shown. Vehicle 2 can continue to close up at this slow speed to the exit end of section 2.

Figure 3:
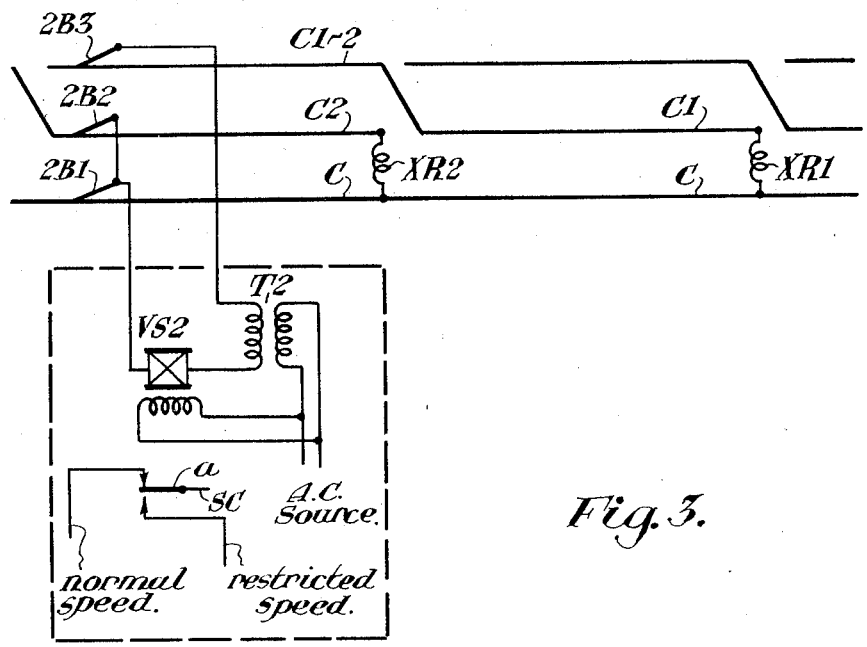
FIG. 3 shows part of a similar speed control system embodying a second form of my invention.

A second specific form of my invention is embodied in the system shown in FIG. 3. Referring now to this drawing figure, it is to be noted that only part of the full arrangement equivalent to that of FIG. 2 is shown. In other words, the wayside conductors for sections 1 and 2 and a single vehicle equivalent of Vehicle No. 2 of FIG. 2 are shown as this is sufficient for an understanding of this specific embodiment. The vehicle, of course, has also a propulsion control circuit unit as in FIG. 2 but for purposes of simplicity this has been omitted. The vehicle sensor relay VS2 is now a two winding, alternating current relay. The local winding, indicated by the winding symbol below the relay coil symbol, is connected directly across the local alternating current source. For example, this may be the single phase, shown in FIG. 2 as supplying the primary winding of transformer T2, which is one phase of a three phase propulsion source supply for the assumed system. The operating winding of relay VS2 is connected in series with the secondary winding of transformer T2 across contactors 2B1 and 2B3. Contact a of relay VS2 is connected as before, speed control power lead SC from the propulsion control circuits being connected to the heel of contact a and the normal and restricted speed selection circuits being connected, respectively, to the front and back points of contact a. This is identical to the speed selection circuits shown in FIG. 2 and needs no further explanation.

It is to be understood that two winding alternating current relays such as used in this particular form operate on the torque provided by the phase shift between the current flowing in the operating winding and that flowing in the local winding. In addition to the shift inherent in the relay and transformer windings, additional phase shift is provided in the present system by the reactor connected across the conductors at the exit end of each section as the sensor associate. For example, the reactor XR1 is connected between conductors C1 and C at the exit end of section 1 to form the sensor associate device for this particular form of my invention. Under the conditions shown in FIG. 3, a circuit is then traced from the upper terminal of the secondary winding of transformer T2 over contactor 2B3, conductors C1–2 and C1, through reactor XR1, conductor C, and contactor 2B1 through the operating winding of relay VS2 to the lower terminal of the secondary winding. The phase of the current flowing in this circuit is additionally shifted by the impedance of reactor XR1 so that the necessary difference in phase relationships between this current and the current in the local winding of the relay is obtained to provide sufficient torque to cause the relay to pick up. This, of course, closes its front contact a to provide a normal speed range selection for the propulsion control circuitry.

If a vehicle occupies section 1 so that the permanent shunt connection between its contactors B1 and B2 provides a connection from conductor C1 to conductor C to bypass reactor XR1, there is no additional phase shift in the current flowing in the operating winding of relay VS2 although the current would continue to flow at relatively the same level. Since there is insufficient difference in the phase relation of the currents in the operating and local windings, there is now insufficient torque to cause the relay to operate and its contact is released. The closing of back contact a of relay VS2 selects the restricted speed range for the propulsion control circuitry. Thus the presence of a preceding vehicle in the immediate advance section results in the lack of a distinctive reflected signal for operating the vehicle sensor relay VS2. The restricted speed is selected for this vehicle so that it may proceed only at this slow speed to close up upon the preceding vehicle. Thus the selective energization of the propulsion control circuitry results in the same speed control enforcement as in the form of the invention shown in FIG. 2.

A third specific form of my invention is embodied in the system arrangement shown in FIG. 4. Again, only a partial showing of a complete system is made consisting of two sections of the right-of-way and one vehicle moving thereon. The vehicle shown in FIG. 4 is the equivalent of Vehicle No. 2 of FIG. 2. For simplicity, the propulsion control circuit unit is not specifically shown but is controlled by contact a of relay VS2 in the previously discussed manner. In this form, the vehicle sensor and the sensor power units of FIG. 2 are replaced by an audio frequency receiver 2RU and an audio frequency transmitter 2TU, respectively. Relay VS2 acts in conjunction with the audio frequency receiver 2RU to complete the vehicle sensor and speed selection arrangement. Relay VS2 is shown as an ordinary neutral relay although it again may be, if desired, a biased relay. Details of the transmitter and receiver units are not shown specifically as they may be of any suitable type known in the railway signaling art. Specifically they may be of the type shown in U.S. Patent No. 3,223,934 issued to Philip H. Luft on Dec. 14, 1965, particularly the transmitter and receiver units shown in FIGS. 2 and 3, respectively, of this patent. The units used herein should be of the fail-safe design as disclosed in this Luft patent. Only the output transformer and tuning capacitor of the transmitter are shown while in the receiver unit only the input transformer is specifically shown, together with a reactor coil RXR2. Actualy the receiver unit is slightly modified from that shown in the Luft patent by removing from the unit the tuning capacitor normally included within the unit itself. This leaves only the reactor portion of the series LC tuning arrangement, the reactor being that designated, as previously mentioned, by the reference RXR2. The capacitance necessary to complete the series tuning circuit is instead connected as the sensor associate device at the exist end of each wayside section. For example, capacitor XC1 shown connected between conductors C1 and C at the exit end of section 1 is comparable with the tuning capacitor normally used within the receiver unit and serves, as will be described, to complete the tuning of the receiver to the selected frequency of the transmitter. The required power supply for the transmitter and receiver units is furnished on the vehicle but is not specifically shown in FIG. 4 since the use of such power supplies of the necessary type and capacity is conventional and understood in the art.

The output and input circuits of the transmitter and receiver units, respectively, are connected in series across vehicle contactors 2B3 and 2B1. If no preceding vehicle is occupying section 1, the situation as shown in FIG. 4, the vehicle sensing circuit is completed from the right hand output terminal of transmitter 2TU over contactor 2B3, conductors C1-2 and C1, capacitor XC1, conductor C, contractor 2B1, reactor RXR2, and the primary of the input transformer of receiver 2RU to the left output terminal of the transmitter unit. The transmitter unit is so designed that its output circuit is tuned to the preselected frequency of the unit by the capacitor connected in series with the secondary of its output transformer. The sensing circuit is further so designed by the selection of the values of reactor RXR2 within the receiver unit and the value of the sensor associate capacitor XC1 that the circuit is tuned to the output frequency of the transmitter unit. In the circuit just traced, with no vehicle occupying section 1, sufficient curent thus flows to actuate receiver 2RU so that its associated receiver relay VS2 is picked up. It may be further noted that the output frequencies of all transmitters and the value of the reactor RXR within each receiver are so selected that they are the same. Therefore, the sensor associate capacitors XC connected at the exit end of each section will react with all vehicles in a similar manner to that just described. Obviously, with relay VS2 picked up, the closing of its front contact *a* selects the normal speed range for this vehicle. This is proper because an absence of any preceding vehicle in the immediate advance section is indicated by the operation of the sensing means.

If a vehicle does occupy the advance section, so that the shunt between its contactors B1 and B2 is connected, referring to FIG. 4, between conductors C1 and C within section 1, the sensor associate capacitor unit XC1 is bypassed by this vehicle occupancy shunt. This removes any tuning from the series circuit above traced so that receiver unit 2RU receives insufficient current flow to actuate its associated relay VS2. Relay VS2 therefore releases, closing its back contact *a* to select the restricted speed range for the associated vehicle. This again is a proper reaction since the vehicle sensing means has indicated that a vehicle is occupying the immediate advance section and a restricted speed range is required for safety purposes. It is to be noted that although the output circuit of the transmitter unit is tuned by the capacitor within the unit, the reflected impedance of the series circuit into which the transmitter feeds is dependent upon the presence of a sensor associate capacitor XC in order to provide an impedance range that will permit the flow of sufficient current at the preselected frequency of the transmitter unit to actuate the receiver.

If additional speed range selections are desired over that shown in the previously discussed arrangements, the system of FIG. 2 may be modified as indicated in FIG. 5. The modifications consist of adding a fourth wayside conductor in each section and, on the vehicles, a second vehicle sensor and sensor power means and a fourth coupler contactor. Such an arrangement provides a three indication or three speed control system. As shown in FIG. 5, the fourth conductor along the right-of-way is sectionalized in a manner similar to that of the prime and third position conductors previously used. At the exit end of each section, this added fourth position conductor is cross connected to the third position conductor of the immediate advance section, that is, to the advance section conductor in the next higher preference position. It is to be noted that the third position conductor is still cross connected to the advance section prime position conductor. As specificaly shown in FIG. 5, the diode connected between the prime position and the continuous conductors at the exit end of each section is poled in the same direction as in FIG. 2, that is, the forward direction of current flow is from the prime position conductor to the continuous conductor.

The single vehicle outlined in FIG. 5 is equivalent to Vehicle No. 3 of FIG. 2 and is again illustrated as occupying section 4 of the right-of-way. The vehicle carried apparatus has been modified in three instances, as previously noted. First, a fourth contactor has been added, designated by the reference 3B4, to couple to the fourth position conductor. Because of the various cross connections, it is obvious from an inspection of the drawings that this fourth position conductor in section 4 is an extension of the prime position conductor of the second section in advance, that is, section 2, and is therefore designated by the reference C2–4. It is also to be noted that the permanent shunt connection is still provided between contactors 3B2 and 3B1 for the purpose of providing an indication of section occupancy by the particular vehicle. The sensor power source transformer T3 and the associated vehicle sensor relay VS3 are still connected in multiple across contactors 3B1 and 3B3 of this particular vehicle. However, there is added a second sensor power source transformer T3A and a second vehicle sensor relay VS3A. These are connected in parallel across contactors 3B1 and 3B4 in a manner similar to that of the original power source and vehicle sensor means. The primary windings of transformer T3 and T3A are connected in parallel across the same single phase of the propulsion power supply which is still assumed to be a three phase source. The windings of these transformers are so connected and poled, as indicated by the dot symbol associated with the upper terminal of each winding, that the same phase relation, that is, the same instaneous output polarity, is obtained from each secondary winding. From an inspection of the circuits, it is obvious then that the connection from each secondary winding to the continuous wayside conductor at contactor 3B1 has the same instantaneous polarity.

Since two vehicle sensor relays are now used, the speed selection circuits have been modified accordingly to provide the additional speed control. The normal speed range is selected when both relays are picked up to close their front contacts *a* in series, this circuit extending from the propulsion control circuitry over lead SC and front contacts *a* in series, of relays VS3A and VS3 to the normal speed circuit terminal of the propulsion control circuitry. A medium speed is selected for the vehicle when relay VS3A is released and relay VS3 remains picked up, the circuit extending from lead SC over back contact *a* of relay VS3A and front contact *b* of relay VS3 to the medium speed terminal of the propulsion control circuits. When both relays are released, the restricted speed terminal is selected, the circuit extending from power lead SC over back contact *a* of relay VS3A and back contact *b* of relay VS3. However, a second circuit for selecting the restricted speed range is required and is traced from lead SC over front contact *a* of relay VS3A and back contact *a* of relay VS3. This circuit is required for safety purposes since a vehicle occupying the immediate advance section is not detected by the release of relay VS3A, as will appear from the following discussion. Therefore, any time that relay VS3 is in its release position, the restricted speed range must be selected.

The operation of the system of FIG. 5 is obviously similar to that of the previously discussed system of FIG. 2. With no preceding vehicles occupying sections 3 or 2 of the fixed right-of-way, relays VS3 and VS3A are both picked up. The wayside circuits involved in the output from transformer T3 can be traced from the upper terminal of the secondary winding of this transformer over contactor 3B3, conductor C3–4, conductor C3, diode D3, conductor C, and contactor 3B1 to the lower terminal of the secondary winding of transformer T3. As a result of this circuit and the rectifying action of diode D3, the winding of relay VS3 is energized by a pulsating direct current having half-wave rectified characteristics, in the manner previously described. This is sufficient energization for relays of the type used for relay VS3 to pick up and close its front contacts. The similar circuit for the secondary winding of transformer T3A is traced from the upper terminal of the secondary winding over contactor 3B4, conductors C2–4, C2–3, and C2, diode D2, conductor C, and contactor 3B1 to the lower terminal of the secondary winding of transformer T3A. Since the winding of relay VS3A is connected in multiple across the secondary of the transformer, it also is energized by a pulsating direct current and receives sufficient energy to pick up, closing its front contact. Since front contacts $a$ of both of the vehicle sensor relays are thus closed, the normal speed range selection circuit is completed and the propulsion control circuits maintain the vehicle speed within this range.

If a vehicle is occupying section 2 of the right-of-way so that its vehicle carried occupancy connection provides a shunt between conductors C2 and C bypassing diode D2, there is no rectification of the output of the secondary winding of transformer T3A. Relay VS3A is then insufficiently energized, the current further having primarily an alternating current component, so that the relay releases. This action was fully explained in connection with the system of FIG. 2 and needs no further repetition here. With back contact $a$ of relay VS3A now closed and front contact $b$ of relay VS3 remaining closed, the circuit for the medium speed selection is completed and the propulsion control circuits react accordingly to maintain the vehicle at a medium speed level. With a complete wayside section between the location of the vehicle and the preceding vehicle, a medium speed range is within the safety requirements since a full section for braking is still available. It is also to be noted that if the medium speed selection is desired in particular locations, where a wayside hazard such as a curve exists, in order to reduce the speed of vehicles over the stretch of hazardous right-of-way, such selection may be obtained by omitting the fourth wayside conductor over that particular section. This is specifically shown in section 2 of FIG. 5 where the fourth conductor position is vacant. Under these circumstances, no wayside circuit exists for the output of the secondary winding of transformer T3A. In the absence of any rectification of the alternating current, the current flowing in the winding of relay VS3A is entirely an alternating current which causes the relay to release, resulting in a medium speed selection throughout the stretch of the hazard.

Returning now to the operation of circuits shown in FIG. 5, if a preceding vehicle occupies section 3 so that its vehicle carried shunt provides a direct connection between conductors C3 and C bypassing diode $d3$, relay VS3 is released since the output of the secondary winding of transformer T3 is not now rectified. Under these circumstances, current is shunted away from the winding of relay VS3 and what small flow remains is primarily of an alternating current nature so that the relay is forced to release. The closing of back contacts $a$ and $b$ of relay VS3 selects the restricted speed range circuit to the propulsion control circuitry, whether relay VS3A is picked up or released, over the circuits previously discussed. This selection of restricted speed is proper since the immediate advance section is occupied by the preceding vehicle and the restricted speed range is the only safe level of speed during the closing up period. As a further explanation, it is to be noted that, if no other preceding vehicle occupies section 2 while this vehicle occupies section 3, the shunt between conductors C3 and C in section 3 does not affect the operation of the circuits including the secondary winding of tarnsformer T3A and the winding of relay VS3A. In other words, the circuit through diode D2 is complete so that the output of secondary winding of transformer T3A is still half-wave rectified and relay VS3A sufficiently energized to pick up. Thus the restricted speed selection is a direct result of the detection of a vehicle occupying the immediate advance section and other preceding vehicles have an insignificant effect upon this speed selection action.

Another modification of the first form of the invention, which may be used where additional speed controls are desired, is embodied in the arrangement shown in FIG. 6. This arrangement adds to the system of FIG. 2 a second vehicle sensing relay on each vehicle and some operational wayside equipment. This arrangement also modifies the identical polarity connections of the sensor associate diodes connected between the wayside conductors at the exit end of each right-of-way section. Referring specifically to FIG. 6, the wayside conductors are shown across the top of the drawing in a pattern similar to that used in FIG. 2. An exception is to be noted in that the polarity connections of diodes D2 and D4 are reversed, from that previously used, for purposes which will be fully explained shortly. Further, at the exit end of section 3, the connections of diode D3 across conductors C3 and C are carried over code following contacts of a code transmitter CT. Transmitter CT is a conventional, well known prior art coding relay device which, when energized, operates its contacts periodically between two extreme positions at a periodic rate, for example, on the order of 75 to 180 times per minute. In the system here shown, transmitter CT is permanently energized by connecting its winding between terminals B and N of a direct current source, not specifically shown as the use of such sources is conventional. This energization results in a continuous coding operation of the transmitter contacts between their extreme positions to follow the code rate selected for the transmitter, as indicated by showing the movable portion of each contact dotted in each position. The connections of diode D3 are thus periodically pole changed as they are alternately connected over front and back contacts of transmitter CT between wayside conductors C3 and C. It is to be noted that, if the energy supply to the winding of transmitter CT is interrupted or the unit itself fails in its operation, the movable contacts halt in the open circuit position which, as will become apparent, provides fail-safe operation.

On the vehicle, which is the equivalent of Vehicle No. 3 in FIG. 2 occupying section 4, transformer T3 and vehicle sensing relay VS3 are similar to those of the prior system and have the same connections across the wayside conductors through the vehicle carried contactors. A second vehicle sensing relay VS3A, of the same biased type, is connected in parallel with relay VS3 but with the polarity connections of the biased winding reversed. Because of the coding action of relay CT in the operation of the system, both relays VS3 and VS3A are here provided with slow release characteristics, as indicated by the downward pointing arrow drawn through the movable portion of their contacts, so that they will remain picked up to decode the periodic pulses which may be received from the wayside during system operation. As will become apparent, the bias characteristic of these relays is required in this form.

Also on the vehicle, the propulsion control circuitry indicated by the conventional block at the lower part of the vehicle symbol is modified to provide additional speed ranges required by the system. The operation of the propulsion control circuits to provide the normal and restricted speed ranges is similar to that used in the previously described system. The curve speed range indicated by the note on the drawing is somewhat equivalent to the medium speed range used in the system of FIG. 5. However, it is used here for controlling the vehicle during movement over hazardous sections along the right-of-way such as curves requiring a speed limit somewhat lower than normal speed. For passage to diverging routes over trackway devices such as switches requiring a still lower speed, the switch speed range is provided. The restricted speed range selection permits movement only at an even slower speed expecting to stop.

The circuit for normal speed range selection may be traced from power lead SC over front contacts $a$ in series, of relays VS3A and VS3 to the normal speed terminal of the propulsion control circuitry. This is similar to the system of FIG. 5, in that both vehicle sensing relays must be picked up for a normal speed range selection. The circuit to the curve speed range terminal extends from lead SC over front contact $a$ of relay VS3A and back contact $a$ of relay VS3. Thus for a selection of the curve speed when desired, relay VS3 must be in its released position while the other relay remains picked up. The selection of the switch speed terminal requires that relay VS3A be released to close its back contact $a$ while relay VS3 remains picked up, the circuit including its front contact $b$. Finally, restricted speed range selection occurs when both relays are released so that the circuit extends from lead SC over back contact $a$ of relay VS3A and back contact $b$ of relay VS3. As will become apparent in the following discussion, there is no safety requirement in this embodiment of my invention for a second circuit for selection of the restricted speed range terminal since both vehicle sensor relays will be released when a preceding vehicle occupies the immediate advance section.

In discussing the operation of the system of FIG. 6, it is initially assumed that the illustrated vehicle is occupying section 4 and that no other vehicle is occupying any of the other sections shown. Under these occupancy conditions, when transmitter CT, during its operation, closes its front contacts $a$ and $b$, a wayside circuit for operating relay VS3 exists which may be traced from the upper terminal of the secondary winding of transformer T3 over contactor 3B3, conductors C3–4 and C3, front contact $a$ of transmitter CT, diode D3, front contact $b$ of transmitter CT, conductor C, and contactor 3B1 to the lower terminal of the secondary winding. In a manner previously explained, relay VS3 is energized during this condition by a pulsating direct current with half-wave rectified characteristics. The direct current component of this pulsating current occurs during the half cycles that the lower terminal of the secondary winding of transformer T3 has an instantaneous positive polarity. Thus the current flow through the winding of relay VS3 is in the direction of the arrow and also provides sufficient energy to cause relay VS3 to pick up to close its front contacts. When contacts $a$ and $b$ of transmitter CT are closed in their lower position, the circuit existing through the wayside conductors is substantially the same as that previously traced except for now including the back contacts so that the actual polarity of the connections of diodes D3 between conductors C3 and C is reversed. Under these conditions, relay VS3A is energized by a pulsating direct current, the direct current component occurring when the upper terminal of the secondary winding of transformer T3 has the instantaneous positive polarity. This current flow is in the proper direction through the relay winding and provides sufficient energy for relay VS3A to pick up and close its front contacts.

Since relays VS3 and VS3A are connected in parallel across contactors 3B1 and 3B3, it is apparent that when current flows through one relay winding, a similar current flows in the other relay winding. Thus when front contacts of transmitter CT are closed, a pulsating current also flows in the winding of relay VS3A. The direct current component of this current is of opposite direction to the bias indicating arrow and thus will not properly energize the relay. Conversely, when back contacts of transmitter CT are closed, a pulsating direct current opposite to the arrow flows in the winding of relay VS3. However, the slow release characteristics of these relays are selected so that the relays will hold front contacts closed as long as they are periodically energized with current of proper polarity. In other words, the two vehicle sensor relays VS3 and VS3A are designed with slow release characteristics which will hold the relays in their picked up condition against a code pulse of current flowing in the wrong direction through the relay winding as long as, during the coding action, they periodically receive pulsating direct current of the proper polarity. Thus as long as continuous coding action by transmitter CT continues, relay VS3 and VS3A will remain picked up to hold their front contacts closed.

With relays VS3 and VS3A both picked up, closing their front contacts $a$ in series, the circuit is completed for the normal speed selection and the propulsion control circuits operate to maintain the vehicle within such a speed range. If another vehicle is occupying section 3, so that its vehicle carried occupancy shunt completes a circuit between conductors C3 and C bypassing the coding contacts and diode D3, no circuit exists for the rectification of the output of the secondary winding of transformer T3 in either position of the coding contacts. Relays VS3 and VS3A thus both release to select the restricted speed range for the vehicle. It may also be noted that if any failure occurs in the operation of transmitter CT so that its contacts all remain open, diode D3 becomes disconnected from conductors C and C3. Under this condition, relays VS3 and VS3A receive only alternating current and release. The restricted speed selection circuit is then completed so that the speed of the vehicle is reduced to this slow speed which is in the fail-safe direction of operation.

If the vehicle shown in FIG. 6 advances into section 3 of the right-of-way, the secondary winding of transformer T3 and the windings of relay VS3 and VS3A are then connected in multiple by contactors 3B3 and 3B1 across wayside conductors C2–3 and C. With the cross connection from conductor C2–3 to conductor C2 in the immediate advance section, the wayside channel now includes diode D2. Under these circumstances, the flow of current in the wayside circuit is only blocked when the upper terminal of the secondary winding of transformer T3 has the instantaneous positive polarity. This results in the winding of relay VS3A receiving pulsating direct current energy of the proper polarity while the winding of relay VS3 receives only pulsating direct current energy of the incorrect polarity. Thus relay VS3A remains picked up but relay VS3 releases very shortly after the vehicle enters section 3. This combination of the relay positions selects the curve speed range over front contact $a$ of relay VS3A and back contact $a$ of relay VS3 as previously explained.

As the vehicle advances into section 2 of the right-of-way, the multiple connected combination of the secondary winding of transformer T3 and the windings of both vehicle sensor relays is now coupled across wayside conductors C1–2 and C. This includes in the wayside channel conductors C1 and diode D1. This diode is connected with an opposite polarity to that of diode D2. Under these conditions, therefore, the polarity of the pulsating direct current resulting from the half-wave rectification by diode D1 is the reverse of that previously received. Now relay VS3 is properly energized by the flow of current and picks up while relay VS3A receives an incorrect polarity pulsating direct current and releases. With relay VS3 picked up and relay VS3A released, the circuit from lead SC is completed over back contact $a$ of relay VS3A and front contact $b$ of relay VS3 to the switch speed terminal of the propulsion control circuitry. A selection of the switch speed range initiates a deceleration by the vehicle in preparation for a diverging move.

In reviewing the discussion of control of a vehicle during the time it is receiving a curve speed or a switch speed signal, it is obvious that, if the immediate advance section in either case is occupied by a preceding vehicle, its vehicle carried occupancy shunt will bypass the particular diode involved in the wayside circuit. Under this condition, no rectification of the output of the secondary winding of transformer T3 will occur and, for reasons previously discussed, both vehicle carried relays release to select the restricted speed range of operation. It is also to be noted that a curve speed section such as section 3 does not necessarily precede one requiring the switch speed such as section 2. However, such an arrangement may be adopted, as illustrated here, to cause a pre-reduction of the vehicle speed. On the other hand, the switch speed control may be engineered within the propulsion control circuits to allow for its initiation while the train is proceeding at any speed. While it is obvious that the system of FIG. 6 requires operational wayside apparatus such as the code transmitter CT, vehicle sensing or detection is still basically a result of the apparatus carried on each vehicle. The failure of the apparatus such as transmitter CT will cause only the imposing of a restricted speed operation while the affected section is traversed by the vehicle.

It is thus to be seen that the systems embodying my invention provide a vehicle speed control system, for controlling the movement of a vehicle along a fixed right-of-way of various configurations, in which the major portion of the active, operating apparatus is carried on the vehicle itself. With the exception of the wayside code transmitter in the final arrangement illustrated, wayside apparatus is in general of an inert nature and thus subject to very low probability of failure. This not only reduces the cost of installation of such a system but also the cost of its maintenance thereafter. The sensing or detection of a preceding vehicle by the apparatus carried by each vehicle is positive and reliable and provides for safe operation. Failure of any of the vehicle carried apparatus will result in the imposition of a reduced speed range for the vehicle which is in the direction of fail-safe operation. Sufficient variety in the selection of the actual vehicle carried apparatus and in the selection of the number of speed control ranges in operation provides for the efficient design of a specific arrangement that should fulfill any requirements for such transportation systems within a reasonable cost level.

Having thus described my invention, what I claim is:
1. A speed control system for vehicles traversing a fixed right-of-way which is divided into predetermined sections, comprising,
 (a) a plurality of wayside communication channels extending along said right-of-way for preselected distances and arranged in a predetermined pattern for establishing the location of vehicles within said sections,
 (b) a sensing means on each vehicle coupled to said wayside channels in a predetermined manner for transmitting and receiving distinctive signals to and from, respectively, sections in advance of that occupied by the corresponding vehicle,
 (c) a sensor associate means connected into preselected wayside channels at the exit end of each section and responsive only to the distinctive signals transmitted by said sensing means on an approaching vehicle outside the corresponding section for reflecting a related distinctive signal over said wayside channels to said approaching vehicle,
 (d) an occupancy indication means on each vehicle coupled to said wayside channels for blocking the response of said sensor associate means at the exit end of the section then occupied by that vehicle and for returning another signal in response to a signal transmitted from a following vehicle, and
 (e) speed and propulsion control means on each vehicle controlled by the corresponding sensing means for maintaining the speed of that vehicle within a first range when reflected distinctive signals are received and within a second range in the absence of said reflected signals.

2. A vehicle speed control system as in claim 1 further including,
 a plurality of coupling devices mounted in prefixed positions on each vehicle for electrically coupling the corresponding sensing means and occupancy indication means in a predetermined manner to the pattern of said wayside channels in each section.

3. A vehicle speed control system as in claim 1 in which each vehicle carried sensing means comprises,
 (a) a sensor power means for generating and transmitting said distinctive signals over said wayside communication channels, and
 (b) a vehicle sensor means for receiving said reflected distinctive signals and controlling said speed and propulsion control means in accordance with the reception or absence of said reflected signals.

4. A vehicle speed control system as claimed in claim 1 in which,
 (a) each vehicle carried sensing means comprises,
  (1) a sensor power means for transmitting said distinctive signals over said wayside communication channels,
  (2) a vehicle sensor means for receiving said reflected signals and controlling said speed and propulsion control means in accordance with the reception or absence of said reflected signals,
 and further including
 (b) a plurality of coupling devices mounted in prefixed positions on each vehicle for electrically coupling the corresponding sensor power means, vehicle sensor means, and the occupancy indication means in a predetermined manner to the pattern of said wayside channels in each section.

5. A vehicle speed control system as claimed in claim 4, in which said wayside communication channels comprise a plurality of electrical conductors positioned parallel ot said right-of-way and including,
 (a) a continuous conductor extending along said right-of-way in a first position,
 (b) a prime position conductor extending along the length of each section of said right-of-way adjacent said continuous conductor, and
 (c) at least one other conductor in a lower preference position also extending along the length of each section,
 (d) each other conductor associated with a particular section being cross connected to the next higher preference position conductor, including the prime position, extending along the immediate advance section of the right-of-way to form said predetermined pattern,
 (e) said sensor associate means being connected between preselected ones of said conductors at the exit end of each section.

6. A vehicle speed control system as claimed in claim 5 in which,
 (a) said coupling devices comprise a contactor associated with each position of said parallel wayside conductors, each contactor prepositioned for providing electrical contact with the same position conductor in each section of said right-of-way,
 (b) said vehicle sensor means and said sensor power means on each vehicle are connected across the associated contactors positioned to contact said continuous wayside conductor and said other conductor in a third position adjacent said prime position in each section,
 (c) each sensor associate means is connected between said continuous and prime position conductors at the exit end of the corresponding section for actuating the vehicle sensor means on a vehicle occupying the approach section,
(d) said occupancy indication means on each vehicle comprises an electrical shunt connection between the associated contactors positioned to contact said continuous and prime position conductors in each section for bypassing the response of the corresponding sensor associate means to prevent actuation of the vehicle sensor means on a following vehicle occupying the approach section,
(e) said vehicle sensor means on each vehicle being operable at least between a first and a second condition in accordance with the reception or non-reception respectively of said reflected distinctive signals for controlling the associated speed and propulsion control means to maintain a normal or a preset reduced speed range respectively.

7. A vehicle speed control system as claimed in claim 6 in which,
(a) said sensor power means on each vehicle comprises an alternating current source connected by the associated contactors across the continuous conductor and said third position other conductor in each section,
(b) each said sensor associate means comprises a half-wave rectifier connected with preselected polarity between the prime position and continuous wayside conductors at the exit end of the corresponding section, and
(c) said vehicle sensor means on each vehicle comprises a direct current relay operable by pulsating direct current and connected in multiple with said alternating current source.

8. A vehicle speed control system as claimed in claim 7, further including,
(a) a second alternating current source on each vehicle having the same output characteristics as said first source and connected by said associated contactors across said continuous conductor and a fourth position other conductor,
(b) a second vehicle sensor comprising another direct current relay operable by pulsating direct current and connected in multiple with said second source,
(c) said speed and propulsion control means on each vehicle being jointly controlled by both said direct current relays for selecting and maintaining an operating speed range in accordance with the operated combination of said relays.

9. A vehicle speed control system as claimed in claim 6 in which,
(a) said sensor power means on each vehicle comprises an alternating current source providing a signal in a selected frequency range,
(b) said vehicle sensor means on each vehicle comprises a pair of biased direct current relays connected in series with opposite polarities, said series circuit connected in multiple with said source being connected by the associated contactors across said continuous and third position conductors in each section,
(c) each sensor associate comprises a half-wave rectifier connected with a polarity selected in accordance with the one of several preset speed ranges preestablished for vehicles traversing the section of said right-of-way in approach to the section corresponding to that rectifier,
(1) said polarity connections at selected sections at times being periodically pole changed to select a particular speed range for approaching vehicles,
(d) said speed and propulsion control means being jointly controlled by both relays in accordance with the operated combination thereof to maintain the established speed range.

10. A vehicle speed control system as claimed in claim 6 in which,
(a) said sensor power means on each vehicle comprises an alternating current source,
(b) said vehicle sensor means on each vehicle comprises a two winding alternating current relay operable only when at least a predetermined phase angle exists between energizing currents in its local and operating windings,
(1) said local winding being connected across an isolated portion of said alternating current source,
(2) said operating winding being connected by the associated contactors in series with said source across said continuous and third position wayside conductors,
(c) each sensor associate means comprises a reactor coil having sufficient impedance to shift the phase angle of the energizing current in said operating winding at least said predetermined angle.

11. A vehicle speed control system as claimed in claim 6 in which,
(a) said sensor power means on each vehicle comprises a signal transmitter providing an output signal having a preselected frequency at least in the audio range,
(1) the output circuit of said transmitter including a portion tuned to said preselected frequency,
(b) said vehicle sensor means on each vehicle comprises a signal receiver means having an input circuit and an output element,
(1) said receiver input circuit including a first part of a tuned circuit necessary for conditioning that receiver means to be responsive to said output signals of the associated transmitter,
(2) each receiver means controlling its output element to a first or a second condition as said receiver means is responsive or non-responsive respectively, to the output signals of the associated transmitter,
(c) said transmitter output circuit and said receiver input circuit on each vehicle being connected in series across said continuous and third position conductors in each section by the associated contactors,
(d) each sensor associate means comprises a circuit element having characteristics to complete the tuned circuit for conditioning each receiver means to respond to said transmitter signals,
(e) said speed and propulsion control means on each vehicle being controlled by the associated receiver means for maintaining said normal or said preset reduced speed ranges as said associated receiver output element is in its first or second condition respectively.

References Cited

UNITED STATES PATENTS

| | | | |
|---|---|---|---|
| 2,000,166 | 5/1935 | Espenschied | 246—63 |
| 2,079,525 | 5/1937 | Place. | |

FOREIGN PATENTS 23,846  12/1911  Great Britain.

ARTHUR L. LA POINT, Primary Examiner

G. H. LIBMAN, Assistant Examiner

U.S. Cl. X.R.

246—187